(12) United States Patent
Leibfried et al.

(10) Patent No.: US 8,813,332 B2
(45) Date of Patent: Aug. 26, 2014

(54) POLYMERIC MATERIALS

(75) Inventors: Richard Thomas Leibfried, Chester Springs, PA (US); Guglielmo Pernice, The Woodlands, TX (US); Geoff Small, Little Bookham (GB); Jack Vloedman, Houston, TX (US); Alan Wood, Penrith (GB)

(73) Assignee: Victrex Manufacturing Limited, Thornton Cleveleys, Lancashire (GB)

( * ) Notice: Subject to any disclaimer, the term of this patent is extended or adjusted under 35 U.S.C. 154(b) by 1351 days.

(21) Appl. No.: 12/036,426

(22) Filed: Feb. 25, 2008

(65) Prior Publication Data

US 2008/0196900 A1    Aug. 21, 2008

Related U.S. Application Data

(63) Continuation-in-part of application No. PCT/GB2006/003021, filed on Aug. 14, 2006, and a continuation-in-part of application No. PCT/GB2006/003002, filed on Aug. 14, 2006.

(30) Foreign Application Priority Data

| Aug. 26, 2005 | (GB) | ................................. | 0517383.6 |
| Aug. 26, 2005 | (GB) | ................................. | 0517385.1 |
| May 11, 2006 | (GB) | ................................. | 0609347.0 |

(51) Int. Cl.
*B23P 6/00* (2006.01)
*E21B 36/00* (2006.01)
*E21B 43/10* (2006.01)

(52) U.S. Cl.
CPC ................. *E21B 36/003* (2013.01); *B23P 6/00* (2013.01); *E21B 43/103* (2013.01)
USPC ................. 29/402.08; 29/402.09; 29/402.18; 29/447; 29/458

(58) Field of Classification Search
CPC ......... B23P 6/00; F16L 33/213; E21B 43/108
USPC ............ 29/402.08, 402.09, 402.18, 447, 458, 29/527.1, 527.2, 507; 138/97
See application file for complete search history.

(56) References Cited

U.S. PATENT DOCUMENTS

| 3,462,825 A | 8/1969 | Pope et al. |
| 3,856,905 A | 12/1974 | Dawson |

(Continued)

FOREIGN PATENT DOCUMENTS

| EP | 0157601 | 3/1985 |
| EP | 0266951 | 5/1988 |

(Continued)

OTHER PUBLICATIONS

"Compress." Merriam-Webster.com. Merriam-Webster, n.d. Web. Jan. 2, 2014. <http://www.merriam-webster.com/dictionary/compress>.*
PCT/GB2006/003002 International Search Report and Written Opinion dated Feb. 26, 2008, 61 pages.

(Continued)

*Primary Examiner* — Jermie Cozart
(74) *Attorney, Agent, or Firm* — Michael Best & Friedrich LLP

(57) ABSTRACT

A method of fitting a compressed component, for example a pipe, in a receiver, for example a bore, comprises compressing a selected component which is made out of a polymeric material having a glass transition temperature of at least 100° C., for example polyetheretherketone; arranging the compressed component in position within a receiver; and subjecting the compressed component to conditions, for example of temperature and/or pressure, whereby the compressed component expands.

15 Claims, 4 Drawing Sheets

(56) References Cited

U.S. PATENT DOCUMENTS

| | | | | |
|---|---|---|---|---|
| 4,446,891 A | * | 5/1984 | Gebelius | 138/97 |
| 4,713,870 A | * | 12/1987 | Szalvay | 29/402.09 |
| 5,114,634 A | * | 5/1992 | McMillan et al. | 264/28 |
| 5,135,698 A | | 8/1992 | Salama et al. | |
| 5,771,937 A | * | 6/1998 | Collins | 138/93 |
| RE36,859 E | | 9/2000 | Storah | |
| 2002/0083990 A1 | * | 7/2002 | Lundman | 138/98 |

FOREIGN PATENT DOCUMENTS

| | | |
|---|---|---|
| EP | 0373633 | 12/1989 |
| FR | 2854938 | 11/2004 |
| GB | 2218370 | 11/1989 |
| JP | 2047042 | 2/1990 |
| JP | 4073128 | 3/1992 |
| JP | 5338060 | 12/1993 |
| JP | 2002338882 | 11/2002 |
| WO | 9002904 | 3/1990 |
| WO | 9967561 | 12/1999 |

OTHER PUBLICATIONS

PCT/GB2006/003021 International Search Report and Written Opinion dated Nov. 28, 2006, 50 pages.

R. K. Krishnaswamy, M. J. Lamborn: "The influence of process history on the ductile failure of polyethylene pipes subject to continuous hydrostatic pressure" Advances in Polymer Technology, [Online] vol. 24, Jul. 15, 2005, pp. 226-232, XP002407897 Online Retrieved from the Internet.

Shailesh R. Doshi: "Prediction of residual stress distribution in plastic pipe extrusion" Journal of Vinyl and Additive Technology, vol. 11, No. 4, Dec. 1989, pp. 190-194.

Xanthos, M. et al., "Plastics Processing" Kirk-Othmer Encyclopedia of Chemical Technology, vol. 3.3, Nov. 14, 2003.

Parker, David et al., "Polymers, High-Temperature" Ullmann's Encyclopedia of Industrial Chemistry, Jul. 15, 2000.

European Patent Office Opposition Against EP1945439 dated Apr. 11, 2013 (23 pages).

European Patent Office Opposition Against EP1945439 dated Apr. 9, 2013 (13 pages).

* cited by examiner

POLYMERIC MATERIALS

RELATED APPLICATIONS

This application is a continuation-in-part of International Application No. PCT/GB2006/003021, filed Aug. 14, 2006, which claims priority to GB 0517383.6, filed Aug. 26, 2005 and GB 0609347.0, filed May 11, 2006, and is also a continuation-in-part of International Application No. PCT/GB2006/003002, filed Aug. 14, 2006, which claims priority to GB 0517385.1, filed Aug. 26, 2005.

BACKGROUND AND SUMMARY OF THE INVENTION

This invention relates to polymeric materials and particularly, although not exclusively, relates to components which comprise a polymeric material and are adapted to be fitted within a receiver. Preferred embodiments relate to swaging a component so that it may be fitted within a receiver and subsequently causing the swaged component to expand so it is urged against parts of the receiver. Exemplary embodiments relate to a method of lining a casing affixed within a wellbore.

GB807413 (Tubovit) discloses a process for lining metal pipes with polyvinyl chloride resin (PVC) or other vinyl resins. The process involves first heating a PVC liner to a temperature between its Vicat softening point (about 90° C.) and 140° C. or higher, mechanically deforming the liner and introducing it at the aforementioned elevated temperature into the metal pipe. This causes spontaneous cooling of the liner. Thereafter, the pipe and liner are again heated to a temperature which may be at or near the temperature of said first heating, which causes the liner and metal to adhere to one another.

A problem with the aforementioned is the risk that a swaged or reduced diameter component for example liner rebounds to at or close to its original diameter before it can be fitted into a receiver, for example metal pipe. Another problem is the need to carefully control heating regimes which may need to be adopted to form the reduced diameter component in the first instance and cooling regimes which may need to be adopted to maintain the reduced diameter component in its reduced state until it has been introduced into a receiver.

In the context of wellbores, as the drilling of an oil or gas well progresses, the well bore is lined with a casing that is secured in place by a cement slurry injected between the exterior of the casing and the well bore. The casing commonly consists of steel tubulars joined by couplings and functions to provide a permanent well bore of known diameter through which drilling, production, or injection operations may be conducted. The casing also provides the structure for attaching surface equipment required to control and produce fluids from the well bore or for injecting fluids therein. In addition, the casing prevents the migration of fluids between subterranean formations through the well bore (e.g., the intrusion of water into oil or gas formations or the pollution of fresh water by oil, gas, or salt water).

Heat loss from produced fluids through the steel tubulars and couplings of the casing to the surrounding subterranean formations is relatively high due to the high thermal conductivity of steel and rock. Heat loss from the produced fluids can be problematic during production. For example, if a gas is produced through the steel tubulars, liquids condensing from the gas due to cooling can result in liquid dropout thereby causing a loss of valuable fluids and reducing the flow of the gas through the steel tubulars. Another problem may arise when temperature loss from the produced fluids induces the formation of scales, paraffin, or other deposits on the steel tubulars, thereby creating restrictions, or even a blockage, of the fluid flow though the steel tubulars.

Though vacuum insulated steel tubing offers sufficient insulation, heat loss from the couplings may reduce the total insulation quality significantly. Furthermore, couplings can create discontinuities along the flow path that result in increased friction and turbulence in the flow of produced fluids. Plastic liners have demonstrated insulation benefits and are more consistent than vacuum insulated steel tubing because they do not have couplings. Plastic liners are generally less expensive than vacuum insulated steel tubing; however, current plastic liners are not as effective in insulation benefits per foot as the vacuum insulated steel tubing.

A method of lining a casing with a continuous string of tubular polymeric material has previously been proposed in U.S. Pat. No. 5,454,419 (Vloedman). The method utilizes a continuous, smooth walled high density polyethylene tubular liner wound on a portable spool. The smooth walled liner has an outer diameter greater than the inner diameter of the casing and is reeled off the spool and through a roller reduction unit to reduce the diameter of the liner so that the liner can be injected into the casing. A weight system connected to the bottom end of the liner maintains the reduced liner in tension so that the liner remains in its reduced state until the liner is positioned at a desired depth. After the liner is run to such depth, the weights are removed thereby allowing the reduced liner to rebound and form a fluid tight seal with the casing and seal any breaches in the casing.

U.S. Pat. No. 6,283,211 (Vloedman) discloses a method of patching a downhole casing using a casing patch which may comprise a high density polyethylene pipe. In the method, the pipe is compressed to form a reduced state and is maintained in its reduced state by weights which are arranged to act on the pipe and maintain it under tension. After the pipe has been positioned in the casing as desired, the weights are removed, thereby to remove the tension and therefore remove the force restricting expansion of the pipe. Accordingly, the pipe expands out against the casing.

One problem associated with the arrangements described is that, in both cases, weights are used to maintain the compressed pipes under tension. These weights are introduced into the casing with the pipe and apparatus must be provided to allow them to be removed to allow the pipe to expand when in position. The provision of weights as described adds to the complexity and/or cost of positioning a pipe in position using the aforementioned methods.

The inventor of the aforementioned patent applications has appreciated the aforementioned problem and has proposed a solution in US2004/0140093 (Vloedman). The solution involves providing a pipe having an exterior surface which is provided with grooves and ridges. The outer diameter of the polymeric pipe is reduceable by the application of radially compressive forces to the ridges so that the outer diameter of the polymeric pipe is less than the inner diameter of the casing. Reduction of the pipe creates point loads that cause the polymeric pipe to deform non-uniformly whereby stress induced to the polymeric pipe by the reduction thereof is stored in the polymeric pipe thereby decreasing the rate of expansion of the polymeric pipe and thus allowing the polymeric pipe to be inserted into the casing to a desired depth prior to the polymeric pipe expanding and engaging the internal wall of the casing. It is made clear in the document that a reduced diameter of pipe which is free of added weight can be introduced into a casing.

However, disadvantageously, the solution according to US 2004/0140093 necessitates use of a complex shaped pipe with its associated costs of production and, in any event, the pipe described still rebounds in about 12 hours so that the reduced diameter pipe cannot be stored for any appreciable length of time prior to introduction downhole. Essentially, therefore, the reduced diameter pipe must be produced at the site where it is to be used.

It is one object of the present invention to address the above described problems.

It is another object of the invention to address the problem of fitting components into receivers.

It is an object of the invention to address problems associated with lining of casings.

According to a first aspect of the invention, there is provided a method of fitting a compressed component in a receiver, the method comprising:
(a*) selecting a compressed component which comprises a polymeric material wherein said polymeric material comprises a first polymer having a glass transition temperature (Tg) of at least 100° C.;
(b) arranging the compressed component in position within the receiver;
(c) subjecting the compressed component to conditions whereby the compressed component expands.

The invention extends to a method of fitting a selected component within a receiver, wherein said selected component comprises a polymeric material and said polymeric material comprises a first polymer having a glass transition temperature (Tg) of at least 100° C., said method comprising:
(a) compressing the selected component thereby to produce a compressed component;
(b) arranging the compressed component in position within the receiver;
(c) subjecting the compressed component to conditions whereby the compressed component expands.

Glass transition temperature may be measured as described in "Procedure 1" hereinafter.

Advantageously, the method may enable a said compressed component to be made from a selected component at a relatively low temperature, for example at ambient temperature, so no separate heating of the selected component may be required to enable it to be compressed. After compression, the compressed component may remain in such a state for a substantial period of time, for example substantially indefinitely, without the need for it to be cooled to less than ambient temperature or for a force to be applied to restrict its expansion. Accordingly, it is possible to delay the fitment of the compressed component in position within the receiver.

The selected component may be too large for it to be fitted in its intended position in the receiver. Hence the need to adjust its size.

Suitably, the receiver has an opening providing access to the intended position for the selected component in the receiver and the selected component may be too large for it to pass through said opening to said intended position.

Preferably, the selected component includes a void region, for example it may be hollow at least in part. Said selected component may be arranged such that when it is compressed to produce the compressed component, the process of compression causes a compressible region of the selected component to move into the void region.

The compressible region may comprise a wall at least a part of which may define an outer surface of the selected component. The wall may be arranged such that it contributes to a dimension of the selected component which restricts the selected component from being fitted in its intended position in the receiver. The wall may have a thickness of at least 0.25 cm, preferably at least 0.5 cm. The thickness of the wall may be selected in dependence upon a diameter of the selected component, with selected components having larger diameters having thicker wall. The wall may have a thickness of less than 2 cm, preferably less than 1.5 cm. The wall may have a thickness as described over an area of at least 50%, preferably at least 75%, more preferably at least 90% of the surface area of at least an outer wall of the selected component.

A force may be applied to the wall to cause said outer surface to move through a distance of at least 1 mm preferably at least 5 mm, especially at least 1 cm.

Preferably, in the method, force arranged to compress the selected component is applied substantially symmetrically to the selected component—that is, each individual externally applied force in one direction is substantially balanced by an equal force applied externally in an opposite direction.

Preferably, said selected component is substantially symmetrical about a first plane and a second plane wherein said first and second planes are at right angles to one another. The selected component may also be symmetrical about a third plane, wherein said first, second and third planes are mutually orthogonal.

Said compressed component may be substantially symmetrically about a first plane and a second plane wherein said first and second planes are at right angles to one another. The compressed component may also be symmetrical about a third plane, wherein said first, second and third planes are mutually orthogonal.

Where the selected component is symmetrical about first and second planes, said compressed component is preferably symmetrically about the same first and second planes. Where said selected component is symmetrical about a third place, said compressed component is preferably symmetrical about the same third plane.

Said method preferably comprises fitting said compressed component between first and second positions of the receiver wherein the distance between the first and second positions is less than the distance between first and second surfaces (e.g. outer surfaces) of the selected component (i.e. before compression) which are in step (b) of the method arranged adjacent to (preferably to abut) said first and second positions of said receiver.

Said method preferably comprises selecting a said selected component and compressing it in step (a) of the method so that the distance between said first and second surfaces (e.g. outer surfaces) is reduced.

Said first and second surfaces are preferably on opposite sides of said selected component, for example on opposite sides of a plane of symmetry of the selected component.

Said first surface of the selected component is preferably part of a compressible region as aforesaid. Preferably, both of said first and second surfaces are parts of compressible regions (suitably different compressible regions) as aforesaid.

Said selected component preferably comprises a pipe. Said pipe preferably has an outside diameter of at least 2.5 cm, more preferably at least 4 cm, especially at least 5 cm. The outside diameter is preferably less than 30 cm, more preferably less than 25 cm. In for example a chemical plant, pipe of diameter about 10 cm (4 inches) may be used; for gas pipes, the diameter may be greater than 20 cm (8 inches).

The ratio of the wall thickness to diameter ratio of a pipe selected for compression may be less than 0.06, preferably less than 0.05, more preferably less than 0.04. The ratio may be at least 0.01, suitably at least 0.02, preferably at least 0.025.

Said pipe preferably has a substantially circular internal cross-section.

The cross-section of the wall of the pipe is preferably substantially annular.

The pipe preferably include a substantially smooth outer surface; preferably along substantially its entire extent.

Preferably, substantially all points on an outwardly facing circumferential surface of the pipe are substantially equidistantly spaced from the centre about which the circumferential surface is defined.

The outside diameter of the pipe is preferably substantially constant for substantially all points on the outside of the pipe. Preferably, the outside diameter is substantially constant along substantially the entire extent of the pipe.

Said selected component, for example said pipe, may have a length (or maximum dimension) of at least 1 m, suitably at least 5 m, preferably at least 10 m, more preferably at least 50 m, especially at least 100 m. In some cases, the component may be even longer, for example 200 m or greater.

Said pipe, for example selected in step (a*) and suitably comprising polyetheretherketone may be arranged to exhibit regions having different levels of crystallinity. For example, a first region towards the outside of the pipe may have a lower level of crystallinity compared to a second region inwards of said first region. Said first region may be substantially amorphous and said second region may be semi-crystalline. Said pipe may include an outer skin which defines an outer surface of the pipe, wherein said outer skin has a lower level of crystallinity compared to a region of the pipe inwards of said outer skin. Said outer skin may be amorphous. Suitably, said pipe includes semi-crystalline regions and, preferably, is substantially entirely semi-crystalline, inwards of said outer skin. A pipe having lower levels of crystallinity, for example amorphous regions as described may be more easily expanded in step (c) compared to a pipe which is semi-crystalline across substantially its entire extent.

When the compressed pipe includes an outer skin which has lower crystallinity (e.g. it is substantially amorphous) compared to the crystallinity of regions inwards of said outer skin, the pipe may be more easily expanded compared to a pipe which is substantially wholly semi-crystalline. For example, a pipe with an outer skin as described may relatively easily be expanded using only a suitable temperature and internal pressure.

In the method, wherein the selected component is a pipe, the outside diameter of the pipe may be reduced by 5-15%, for example 10-15%, in step (a). Thus, the ratio of the outside diameter of said selected component (e.g. pipe) to that of said compressed component (e.g. compressed pipe) may be at least 1.05, preferably at least 1.1. The ratio may be less than 0.3, preferably less than 0.25, more preferably less than 0.2.

In the method, with said selected component at a temperature which may be at least 20° C. less than the Tg of said first polymer, the temperatures suitably being less than 100° C., preferably less than 80° C., more preferably less than 50° C., especially less than 35° C., said selected component may be subjected to, for example contacted with, a compression means to compress the component and produce said compressed component. Preferably, said selected component is initially contacted with a said compression means when said selected component is at a temperature of less than 80° C., preferably less than 50° C., more preferably less than 35° C. Suitably, the temperature of said selected component when it is subjected to, for example initially contacted with, said compression means is less than 80° C., preferably less than 50° C., more preferably less than 35° C. Said temperature may be greater than 0° C., preferably greater than 10° C., more preferably greater than 15° C. Advantageously, the selected component may be at ambient temperature when it is subjected to and/or initially contacted with said compression means and suitably therefore no heat from any external heat source need be supplied.

The temperature of the selected component may rise as mechanical work is done on it during compression.

Preferably, the temperature does not rise to within 20° C., preferably does not rise to within 40° C., of the Tg of said first polymer.

After removal of a force used to compress the selected component, the compressed component may advantageously not need to be subjected to active cooling; it may simply be subjected to ambient temperature.

Suitably, after compression in step (a) and prior to step (b) of the method, said compressed component is subjected to (and may be held at) a temperature (hereinafter referred to as "said post-compression temperature") of less than 50° C., preferably less than 40° C., more preferably less than 35° C. The post-compression temperature may be greater than 0° C., preferably greater than 10° C., more preferably greater than 15° C. Advantageously, the post-compression temperature may be ambient temperature. The selected component may be maintained at said post-compression temperature for at least 5 minutes, preferably at least 30 minutes, more preferably at least 1 hour. Said selected component may be maintained at said post-compression temperature for more than 13 hours. It has been found, advantageously, that the compressed component may be maintained at said post-compression temperature for one or more days or longer (even weeks or substantially indefinitely) and this may allow selected components to be compressed to produce compressed components which may even be stored before being used in step (b) of the method. Compressed components could be produced at a factory and transported to a location wherein they may be used.

The time between the end of step (a) and the end of step (b) (i.e. the time at which the compressed component is in its intended position) may be at least 15 minutes, 30 minutes, 1 hour, 2 hours, 5 hours or more. In some cases, for example where the compressed component is stored prior to use in step (b) it may be more than 12, 24, 36 or 48 hours.

Advantageously, said compressed component may be maintained in its compressed state under the temperature conditions and/or for the time as aforesaid due to intrinsic properties of said polymer.

Said selected component may be maintained substantially in its compressed state provided its temperature does not rise above a relevant glass transition temperature of said polymeric material, for example the glass transition temperature of said first polymer in said polymeric material. Thus, the method preferably includes the step, between steps (a) and (b), of maintaining the temperature of the compressed component below the Tg of the first polymer in said polymeric material.

Thus, suitably, one or a plurality of properties inherent in said compressed component is sufficient, whilst said component is below the Tg of said first polymer, to maintain the compressed component in its compressed state. Preferably, after the end of step (a) and before step (b) (i.e. suitably after removal of said compression means when provided) the compressed component is maintained in its compressed state by one or a plurality of properties inherent in said compressed component. Preferably, between steps (a) and (b), no outside force (e.g. no physical force such as a tension or compression force applied by a force applying means) is applied to said compressed component to restrict it from expanding, for example to restrict it from reverting to (or moving towards) the form and/or size of said selected component.

When the selected component is a pipe as described above, said pipe selected may be swaged in step (a) of the method thereby to produce a compressed pipe (which may be selected in step (a*)). This may include a step of forcing the pipe selected (suitably, a circular cross-section pipe) through an opening, suitably a circular opening, which has a diameter which is less than the outside diameter of the pipe. A mouth of the opening which defines an inlet of the opening preferably tapers inwardly to facilitate location and passage of the pipe through the opening. The pipe is suitably compressed as it is forced through the opening. Preferably, the step of forcing the pipe through the opening includes the application of a force to the pipe in the direction of the longitudinal axis of the pipe. The pipe may be pushed or pulled through the opening to apply said force or a combination of pushing and pulling may be used. Upstream of the opening the pipe may be supported on a carrier, for example a spool (or the like) and unwound from the spool for passage through the opening. A length of pipe of at least 5 m, preferably at least 10 m, more preferably at least 25 m, more preferably at least 50 m, especially at least 100 m may be swaged in step (a). Downstream of the opening, the compressed or swaged pipe may be supported on a carrier, for example wound round a spool (or the like).

In step (b), the compressed component may be manipulated to engage the receiver and be arranged in position within the receiver. Suitably, when the receiver has an opening as aforesaid for providing access to the intended position for the selected component, said compressed component is moved through said opening to said intended position. During step (b), preferably during the entirety of step (b), the temperature of the compressed component does not rise above the Tg of said first polymer. Thus, suitably, the compressed component may be positioned whilst it is in a fixed configuration and/or is not expanding and/or changing its size and/or shape.

In step (c) said compressed component preferably expands back towards the shape and/or size of said selected component. It preferably expands so that it fits tightly within the receiver.

In step (c), the conditions to which the compressed component may be subjected may be one or both of either an increase in temperature or application of pressure. Where temperature is increased, it may be increased by at least 10° C., at least 20° C., at least 30° C. or at least 40° C. The temperature is suitably not increased to more than 50° C. above the Tg of said first polymer. Where pressure is applied, at least 200 psi, suitably at least 500 psi, preferably at least 750 psi may be used. The pressure used may be less than 5000 psi, preferably less than 2500 psi.

In general terms, the lower the temperature is relative to the Tg of the first polymer in step (c) the higher the pressure which may be required to cause appropriate expansion of the compressed component. If the temperature is raised to (or above) the Tg of the first polymer, there may be no need to apply pressure as aforesaid.

When the temperature is increased in step (c), a heating means is preferably provided for directing heat internally or externally to the component. Suitably, said heating means is arranged to direct heat to the compressed component from a position within the component, for example from a void in the component. When the component is a pipe, heating means may be arranged within the pipe to direct heat internally within the pipe. Suitably, heating means comprises a heated fluid.

Where the pressure is increased in step (c), a pressure applying means is preferably provided and suitably is arranged to direct pressure to the compressed component in an opposite direction to the direction the selected component was initially compressed. Said pressure applying means may apply pressure from a position within the component, for example from a void in the component. When the component is a pipe, pressure applying means may be arranged within the pipe to direct a pressure from a position within the pipe outwardly. Suitably, the pressure applying means comprises a fluid.

The same fluid may be used to apply both heat and pressure to the component, for example the pipe.

In general terms, in the case where the component has not been taken beyond its elastic limit (yield point) during step (a), heat alone may be sufficient to bring about expansion in step (c). In this case raising the component to a temperature at or close to the $T_g$ of the first polymer would allow the elastic frozen-in residual stress to recover and the component to expand.

Where permanent deformation has occurred, that is the yield stress of the material has been exceeded during step (a) then the application of heat and pressure may be necessary to bring about the expansion of the component in step (c) The expansion will be based on any residual recoverable stress and generating a high enough stress in the material to ensure that it yields. The yield stress of a polymer will be a function of temperature, the yield stress generally reducing as the temperature is increased. Thus, the pressure required to achieve expansion will be a function of the temperature of the component and its environment.

When the compressed component is pipe having an annular cross-section, the required pressure to cause expansion in step (c) can be estimated from the following expression:

$$P = \frac{2SH}{D}$$

where:
P=estimated pressure to bring about expansion (Pa)
D=external diameter of the pipe (m)
H=wall thickness (m)
S=yield stress of the material at the temperature (Pa) at which the expansion is undertaken Under these circumstances, any deformation resulting from the expansion and yielding will involve an element of recoverable elastic deformation. It will therefore, be necessary to maintain the pressure and temperature for a period following the expansion process in order to allow the decay of this recoverable elastic deformation in order to ensure that the component retains its expanded dimensions. The period of time that the pressure and temperature needs to be maintained will depend on the temperature of the component and its environment. The higher the temperature the shorter the period of time required. If the temperature of the first polymer is above the $T_g$, then the required time will be very much shorter than the time required if the material is below its $T_g$.

Thus, when the compressed component is a pipe, the pipe is preferably subjected to an internal pressure which is between 80% (preferably at least 90%, more preferably at least 95%, especially at least 100%) and 150% of the pressure estimated to be required using the equation.

$$P = \frac{2SH}{D}$$

where P, D, H and S are as described above. In general terms, the higher the pressure above that estimated to be required as described, the faster the rate of expansion.

After the compressed component has been subjected to said conditions in step (c), the compressed component may expand so that it is then too large for it to be removed from its intended position in the receiver. For example, when the receiver includes an opening for providing access to the intended position, after step (c), the component may be too large for it to be removed from the opening. When the method comprises fitting said compressed component between first and second positions of the receiver wherein the distance between the first and second positions is less than the distance between first and second surfaces of the selected component as described above, preferably in step (c), the distance between said first and second surfaces is increased so said surfaces move closer to (preferably to abut) said first and second positions of the receiver. The % expansion of the distance between said first and second surfaces in step (c) may be at least 5%, preferably at least 10%. The distance between said first and second surfaces after step (c) may be less than the distance between said surfaces in said selected component compressed in step (a). However it is possible for the distance to be greater—i.e. expansion so that the component after expansion in step (c) has a dimension which is greater than a corresponding dimension in the selected component.

When the compressed component is a pipe, the ratio of the outside diameter of the compressed pipe produced in step (a) to that of the expanded pipe produced in step (c) may be at least 0.8, preferably at least 0.85. The ratio may be less than 0.95.

When the compressed component is a pipe, the ratio of the outside diameter of the pipe selected before compression in step (a) to that of the expanded pipe produced in step (c) may be in the range 0.9 to 1.1, preferably in the range 0.9 to 1.

Said first polymer may have a $T_g$ of at least 110° C., suitably at least 120° C., preferably at least 130° C., more preferably at least 140° C.

Said first polymer may have a Tg of less than 260° C., for example less than 220° C. or less than 200° C. In some cases, the Tg may be less than 190° C., 180° C. or 170° C.

The lowest Tg of any polymer in said polymeric material may be at least 100° C., suitably at least 110° C., preferably at least 120° C., more preferably at least 130° C., especially at least 140° C. The lowest Tg of any polymer in said polymeric material may be less than 220° C., suitably less than 200° C. It may be less than 190° C. or less than 180° C.

Said first polymer suitably has a melt viscosity (MV) of at least 0.06 $kNsm^{-2}$, preferably has a MV of at least 0.09 $kNsm^{-2}$, more preferably at least 0.12 $kNsm^{-2}$, especially at least 0.15 $kNsm^{-2}$.

MV is suitably measured using capillary rheometry operating at 400° C. at a shear rate of 1000 $s^{-1}$ using a tungsten carbide die, 0.5×3.175 mm.

Said first polymer may have a MV of less than 1.00 $kNsm^{-2}$, preferably less than 0.5 $kNsm^{-2}$.

Said first polymer may have a MV in the range 0.09 to 0.5 $kNsm^{-2}$, preferably in the range 0.14 to 0.5 $kNsm^{-2}$.

Said first polymer may have a tensile strength, measured in accordance with ASTM D790 of at least 40 MPa, preferably at least 60 MPa, more preferably at least 80 MPa. The tensile strength is preferably in the range 80-110 MPa, more preferably in the range 80-100 MPa.

Said first polymer may have a flexural strength, measured in accordance with ASTM D790 of at least 145 MPa. The flexural strength is preferably in the range 145-180 MPa, more preferably in the range 145-165 MPa.

Said first polymer may have a flexural modulus, measured in accordance with ASTM D790, of at least 2 GPa, preferably at least 3 GPa, more preferably at least 3.5 GPa. The flexural modulus is preferably in the range 3.5-4.5 GPa, more preferably in the range 3.5-4.1 GPa.

Said polymeric material may have a tensile strength, measured in accordance with ASTM D790 of at least 20 MPa, preferably at least 60 MPa, more preferably at least 80 MPa. The tensile strength is preferably in the range 80-110 MPa, more preferably in the range 80-100 MPa.

Said polymeric material may have a flexural strength, measured in accordance with ASTM D790 of at least 50 MPa, preferably at least 100 MPa, more preferably at least 145 MPa. The flexural strength is preferably in the range 145-180 MPa, more preferably in the range 145-164 MPa.

Said polymeric material may have a flexural modulus, measured in accordance with ASTM D790, of at least 1 GPa, suitably at least 2 GPa, preferably at least 3 GPa, more preferably at least 3.5 GPa. The flexural modulus is preferably in the range 3.5-4.5 GPa, more preferably in the range 3.5-4.1 GPa.

Said receiver preferably has a shape which corresponds in shape, at least in part, to that of the selected component which is to be fitted therewith. When said selected component comprises a pipe, the receiver may have the same cross-sectional shape as the pipe and preferably has a circular cross-section.

Preferably, said first polymer has a moiety of formula

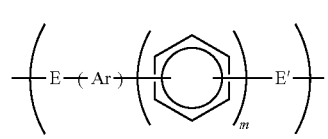

and/or a moiety of formula

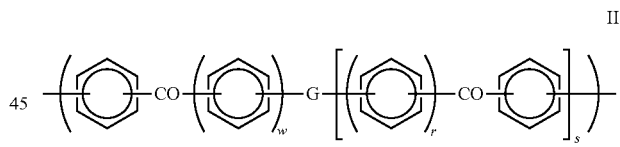

and/or a moiety of formula

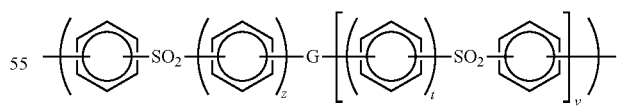

wherein the phenyl moieties in units I, II, and III are independently optionally substituted and optionally cross-linked; and wherein m, r, s, t, v, w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)**, (i) to (vi) which is bonded via one or more of its phenyl moieties to adjacent moieties

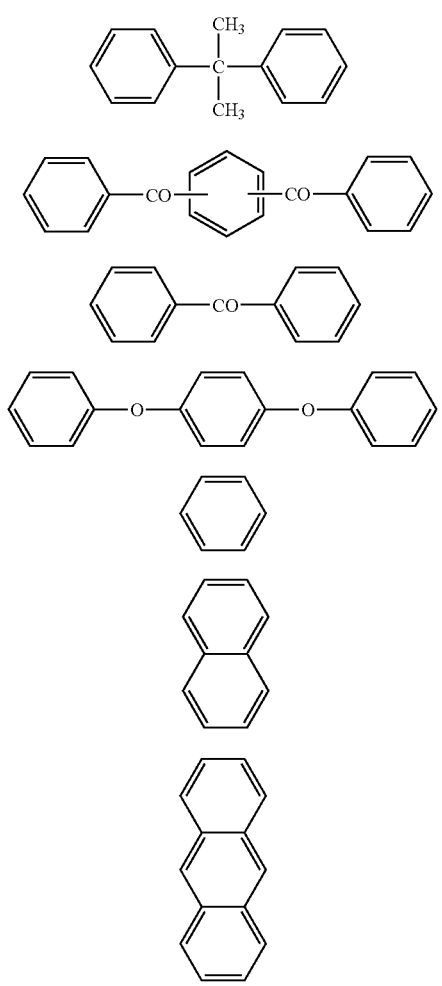

(i)**

(i)

(ii)

(iii)

(iv)

(v)

(vi)

type of repeat unit of formula II; and more than one different type of repeat unit of formula III. Preferably, however, only one type of repeat unit of formula I, II and/or III is provided.

Said moieties I, II and III are suitably repeat units. In the first polymer, units I, II and/or III are suitably bonded to one another—that is, with no other atoms or groups being bonded between units I, II and III.

Phenyl moieties in units I, II and III are preferably not substituted. Said phenyl moieties are preferably not cross-linked.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the first polymer does not include a —S— moiety. Preferably, G represents a direct link.

Suitably, "a" represents the mole % of units of formula I in said first polymer, suitably wherein each unit I is the same; "b" represents the mole % of units of formula II in said first polymer, suitably wherein each unit II is the same; and "c" represents the mole % of units of formula III in said first polymer, suitably wherein each unit III is the same. Preferably, a is in the range 45-100, more preferably in the range 45-55, especially in the range 48-52. Preferably, the sum of b and c is in the range 0-55, more preferably in the range 45-55, especially in the range 48-52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Preferably, said first polymer consists essentially of moieties I, II and/or III.

Said first polymer may be a homopolymer having a repeat unit of general formula

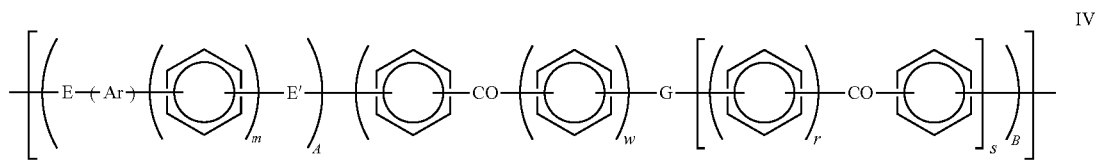

IV or a homopolymer having a repeat unit of general formula

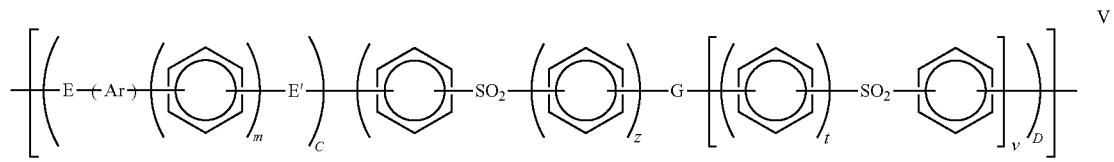

V

Unless otherwise stated in this specification, a phenyl moiety has 1,4-, linkages to moieties to which it is bonded.

In (i), the middle phenyl may be 1,4- or 1,3-substituted. It is preferably 1,4-substituted.

Said first polymer may include more than one different type of repeat unit of formula I; and more than one different or a random or block copolymer of at least two different units of IV and/or V wherein A, B, C and D independently represent 0 or 1 and E, E', G, Ar, m, r, s, t, v, w and z are as described in any statement herein.

As an alternative to a first polymer comprising units IV and/or V discussed above, said first polymer may be a homopolymer having a repeat unit of general formula

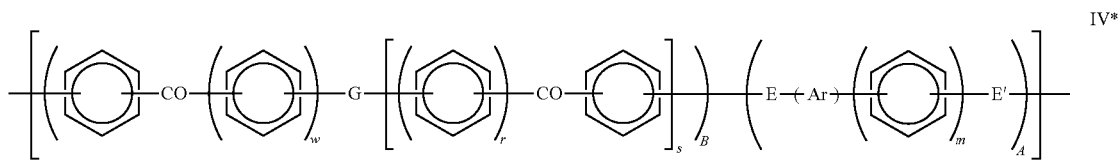

IV* or a homopolymer having a repeat unit of general formula

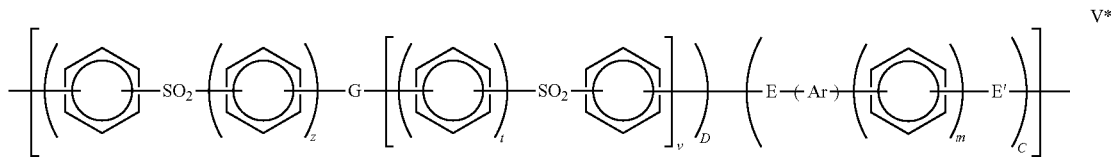

V* or a random or block copolymer of at least two different units of IV* and/or V*, wherein A, B, C, and D independently represent 0 or 1 and E, E', G, Ar, m, r, s, t, v, w and z are as described in any statement herein.

Preferably, m is in the range 0-3, more preferably 0-2, especially 0-1. Preferably, r is in the range 0-3, more preferably 0-2, especially 0-1. Preferably t is in the range 0-3, more preferably 0-2, especially 0-1. Preferably, s is 0 or 1. Preferably v is 0 or 1. Preferably, w is 0 or 1. Preferably z is 0 or 1.

Preferably, said first polymer is a homopolymer having a repeat unit of general formula IV.

Preferably Ar is selected from the following moieties (vii) to (xiii) and (xi)**

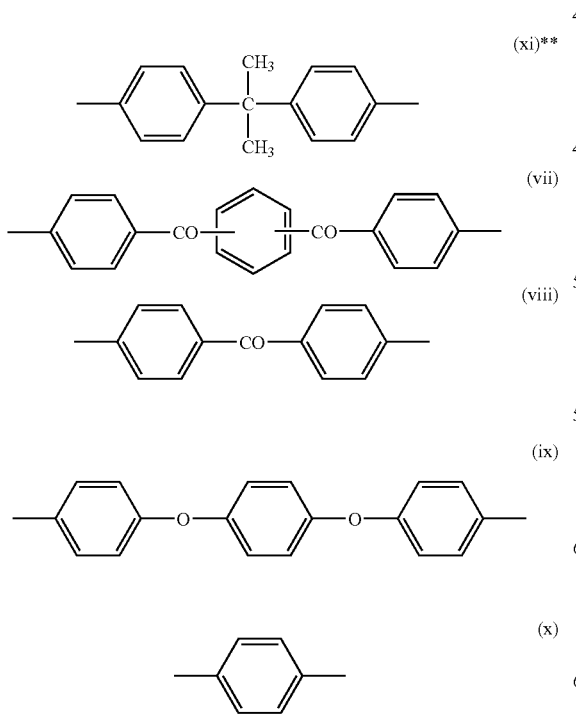

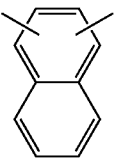

(xi)

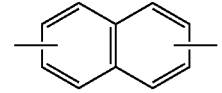

(xii)

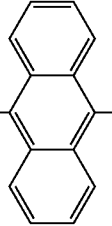

(xiii)

In (vii), the middle phenyl may be 1,4- or 1,3-substituted. It is preferably 1,4-substituted.

Preferably, (xi) is selected from a 1,2-, 1,3-, or a 1,5- moiety; and (xii) is selected from a 1,6-, 2,3-, 2,6- or a 2,7- moiety.

Suitable moieties Ar are moieties (i), (ii), (iii) and (iv) and, of these, moieties (i), (ii) and (iv) are preferred. Other preferred moieties Ar are moieties (vii), (viii), (ix) and (x) and, of these, moieties (vii), (viii) and (x) are especially preferred.

An especially preferred class of first polymers are polymers (or copolymers) which consist essentially of phenyl moieties in conjunction with ketone and/or ether moieties. That is, in the preferred class, the first polymer material does not include repeat units which include —S—, —SO$_2$— or aromatic groups other than phenyl. Preferred first polymers of the type described include:

(a) a polymer consisting essentially of units of formula IV wherein Ar represents moiety (iv), E and E' represent oxygen atoms, m represents 0, w represents 1, G represents a direct link, s represents 0, and A and B represent 1 (i.e. polyetheretherketone).

(b) a polymer consisting essentially of units of formula IV wherein E represents an oxygen atom, E' represents a direct link, Ar represents a moiety of structure (i), m represents 0, A represents 1, B represents 0 (i.e. polyetherketone);

(c) a polymer consisting essentially of units of formula IV wherein E represents an oxygen atom, Ar represents moiety (i), m represents 0, E' represents a direct link, A represents 1, B represents 0, (i.e. polyetherketoneketone).

(d) a polymer consisting essentially of units of formula IV wherein Ar represents moiety (i), E and E' represent oxygen atoms, G represents a direct link, m represents 0, w represents 1, r represents 0, s represents 1 and A and B represent 1. (i.e. polyetherketoneetherketoneketone).

(e) a polymer consisting essentially of units of formula IV, wherein Ar represents moiety (iv), E and E' represents oxygen atoms, G represents a direct link, m represents 0, w represents 0, s, r, A and B represent 1 (i.e. polyetheretherketoneketone).

(f) a polymer comprising units of formula IV, wherein Ar represents moiety (iv), E and E' represent oxygen atoms, m represents 1, w represents 1, A represents 1, B represents 1, r and s represent 0 and G represents a direct link (i.e. polyether-diphenyl-ether-phenyl-ketone-phenyl-).

Said first polymer may be amorphous or semi-crystalline. Amorphous polymers may be used wherein, for example, the component is no subjected to a harsh chemical environment in use.

Said first polymer is preferably semi-crystalline. The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning Calerimetry (DSC).

The level of crystallinity in said first polymer may be at least 1%, suitably at least 3%, preferably at least 5% and more preferably at least 10%. In especially preferred embodiments, the crystallinity may be greater than 30%, more preferably greater than 40%, especially greater than 45%.

The main peak of the melting endotherm (Tm) for said first polymer (if crystalline) may be at least 300° C.

Said first polymer may consist essentially of one of units (a) to (f) defined above. Alternatively, said first polymer may comprise a copolymer comprising at least two units selected from (a) to (f) defined above. Preferred copolymers include units (a). For example, a copolymer may comprise units (a) and (f); or may comprise units (a) and (e).

Said first polymer preferably comprises, more preferably consists essentially of, a repeat unit of formula (XX)

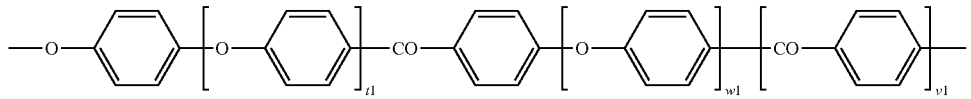

where t1, and w1 independently represent 0 or 1 and v1 represents 0, 1 or 2. Preferred polymeric materials have a said repeat unit wherein t1=1, v1=0 and w1=0; t1=0, v1=0 and w1=0; t1=0, w1=1, v1=2; or t1=0, v1=1 and w1=0. More preferred have t1=1, v1=0 and w1=0; or t1=0, v1=0 and w1=0. The most preferred has t1=1, v1=0 and w1=0.

In preferred embodiments, said first polymer is selected from polyetheretherketone, polyetherketone, polyetherketoneetherketoneketone and polyetherketoneketone. In a more preferred embodiment, said polymeric material is selected from polyetherketone and polyetheretherketone. In an especially preferred embodiment, said polymeric material is polyetheretherketone.

Said polymeric material may comprise a blend of polymers, the blend comprising said first polymer and a second polymer.

Said second polymer may have a Tg above or below that of the first polymer.

Said second polymer may have any feature of and be selected from any class or specific polymer described above for the first polymer. Said second polymer is suitably chemically different compared to the first polymer.

Said second polymer may be selected so that properties of said polymeric material are different from those solely due to the presence of said first polymer in said polymeric material. For example, if said first polymer is blended with a second polymer such that the second polymer is dispersed as a separate phase in a continuous phase defined by said first polymer, then many properties (e.g. solvent resistance etc) of the first polymer will be substantially retained in the polymeric material. However, the presence of second polymer could affect other properties. For example, said second polymer could be a fluoropolymer (e.g. PTFE) dispersed within a matrix of the first polymer for example of PEEK. The fluoropolymer may reduce the coefficient of friction at a surface of the selected component (e.g. pipe) facilitating fitment in the receiver. However, the Tg of the material and the ability of the polymeric material to expand as described may be similar to that of the first polymer alone.

On the other hand, the second polymer could be used to increase the lowest Tg of the polymeric material over and above the Tg of the first polymer alone. By way of example a polyetherimide, such as ULTEM CRS5001 (Trade Mark) may be blended with polyetheretherketone (Tg=143° C.) in a ratio of polyetherimide to polyetheretherketone of less than about 0.4 to produce an immiscible blend comprising the imide dispersed in a continuous phase defined by the polyetheretherketone. In this case, the blend has two Tg's with the lowest being well above 143° C.

Said second polymer may be selected because it is cheaper than the first polymer and so the polymeric material may be prepared more cheaply.

By way of example, the second polymer could be polyethersulphone having a Tg of about 220° C. and the first polymer could again be polyetheretherketone (Tg=143° C.). By forming an immiscible blend of polyethersulphone dispersed in a continuous phase of polyetheretherketone, with a ratio of sulphone to polyetheretherketone of less than about 0.4, polymeric material may be produced which has good chemical resistance and can be used in the method described herein and yet may be cheaper than a polymeric material consisting of polyeretheketone alone. The Tg of the material would be about 143° C.

Examples of immiscible blends which may be of utility as described herein (including blends of three polymers) are described in WO2002/14404, EP211604, U.S. Pat. No. 4,895, 913 and U.S. Pat. No. 4,624,997. Blends of three or more polymers may be used in some cases. In some cases miscible blends of polymers having a single Tg may be used as described in U.S. Pat. No. 5,110,880.

Said first polymer may make up at least 60 wt %, suitably at least 70 wt %, preferably at least 80 wt %, more preferably at least 90 wt %, especially at least 95 wt %, of the total amount of thermoplastic polymer(s) in said polymeric material. Preferably, substantially the only thermoplastic polymer in said polymeric material is said first polymer.

When said polymeric material includes a second polymer, said polymeric material preferably includes less than 30 wt %, preferably less than 25 wt %, more preferably less than 20 wt % of said second polymer.

Said polymeric material could include a filler means.

Said filler means may include a fibrous filler or a non-fibrous filler. Said filler means may include both a fibrous filler and a non-fibrous filler.

A said fibrous filler may be continuous or discontinuous. In preferred embodiments a said fibrous filler is discontinuous.

A said fibrous filler may be selected from inorganic fibrous materials, non-melting and high-melting organic fibrous materials, such as aramid fibres, and carbon fibre.

A said fibrous filler may be selected from glass fiber, carbon fibre, asbestos fiber, silica fiber, alumina fiber, zirconia fiber, boron nitride fiber, silicon nitride fiber, boron fiber, fluorocarbon resin fibre and potassium titanate fiber. Preferred fibrous fillers are glass fibre and carbon fibre.

A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Preferably, said filler means comprises one or more fillers selected from glass fibre, carbon fibre, carbon black and a fluorocarbon resin. More preferably, said filler means comprises glass fibre or carbon, especially discontinuous, for example chopped, glass fibre or carbon fibre.

Suitably, the total amount of filler means in said polymeric material is less than 40%, preferably less than 30 wt %. Preferably, said polymeric material includes substantially no filler means.

Said polymeric material may include:
(i) 70-100 wt % of thermoplastic polymer(s); and
(ii) 0-40 wt %, (suitably 0-30 wt %, preferably 0-20 wt %, more preferably 0-10 wt %, especially 0-5 wt %) of filler means.

Said polymeric material may include:
(i) 70-100 wt % of said first polymer, preferably a polymer of formula (XX) referred to above.
(ii) 0-30 wt % of said second polymer;
(iii) 0-20 wt % of filler means;
(iv) 0-10 wt % of other additives which may be selected, for example, from other polymers, processing aids, colours.

Suitably, said polymeric material includes at least 80 wt %, preferably at least 90 wt %, more preferably at least 95 wt %, especially at least 99 wt % of said first polymer especially a polymer of formula (XX) referred to above.

In one embodiment, the compressed component of the first aspect may be a polyetheretherketone pipe and the receiver is a casing affixed within a well bore. The invention extends to a method of lining a casing affixed within a well bore, comprising the steps of:

(B*) selecting a compressed polymeric pipe having a wall with an inner diameter, an outer diameter, an interior surface, and an exterior surface, wherein said polymeric pipe comprises polyetheretherketone;
(C) passing the compressed pipe into the casing to a predetermined depth; and
(D) subjecting the compressed pipe to conditions whereby the compressed pipe expands against the inner wall of the casing.

The invention further extends to a method of lining a casing affixed within a well bore, comprising the steps of:
(A) selecting a polymeric pipe having a wall with an inner diameter, an outer diameter, an interior surface, and an exterior surface, wherein said polymeric pipe comprises polyetheretherketone;
(B) reducing the outer diameter of the polymeric pipe to produce a compressed pipe by applying a compressive force so that the outer diameter of the polymeric pipe is less than the inner diameter of the casing whereby stress induced to the polymeric pipe by the reduction thereof is stored in the polymeric pipe without maintaining the pipe in tension by use of a force independent of the pipe;
(C) passing the compressed pipe into the casing to a predetermined depth; and
(D) subjecting the compressed pipe to conditions whereby the compressed pipe expands against the inner wall of the casing.

In step (D), the conditions to which the compressed pipe may be subjected may be either one or a combination of an increase in temperature or application of internal pressure and/or compressive loading of the pipe along its axis.

Where temperature is increased, it may be increased by at least 10° C., at least 20° C., at least 30° C. or at least 40° C. The temperature is suitably not increased to more than 193° C. Where pressure is applied, at least 200 psi, suitably at least 500 psi, preferably at least 750 psi may be used. The pressure may be less than 5000 psi, preferably less than 2500 psi. Where axial compressive loading is used, the loads applied need to be below the compressive strength of the material. Where axial compressive loads are applied, the applied compressive stress should preferably be between 2500 psi and 1000 psi and more preferably be between 5000 psi and 7500 psi. The effect of any one condition is to reduce the level of the other conditions that need to be used.

In general terms, the lower the temperature is relative to the Tg of polyetheretherketone in step (D) the higher the pressure and/or axial compressive loading which may be required to cause appropriate expansion of the compressed pipe. If the temperature is raised to (or above) the Tg of the polyetheretherketone, there may be no need to apply pressure and/or axial compressive loading as aforesaid.

Axial compressive loads can be applied by loading the upper and lower extremities of the pipe. In a downhole application this could be achieved by fitting a packer into the well, locating the pipe on top of the packer and then loading the top of the pipe.

According to a second aspect of the invention, there is provided a method of fitting a selected component within a receiver, wherein said selected component is too large for it to be fitted in its intended position within the receiver, wherein said selected component comprises a polymeric material which comprises a first polymer comprising moieties I, II and/or III as described above, said method comprising:
(a) compressing the selected component thereby to produce a compressed component;
(b) arranging the compressed component in its intended position within the receiver;
(c) subjecting the compressed component to conditions whereby the compressed component expands.

The first polymer of the second aspect may have any feature of the first polymer of the first aspect mutatis mutandis.

The polymeric material of the second aspect may have any feature of the polymeric material of the first aspect mutatis mutandis.

Steps (a), (b) and/or (c) of the second aspect may have any feature of steps (a), (b) and/or (c) of the first aspect mutatis mutandis.

Said first polymer of the second aspect is preferably of formula (XX). Preferably, it comprises polyetheretherketone.

According to a third aspect of the invention, there is provided an assembly comprising a selected component as described in the first or second aspects fitted in its intended position in a receiver as described in the first or second aspects.

According to a fourth aspect of the invention, there is provided a compressed component made in a method described herein per se.

A compressed component, for example pipe, may be distinguished from a component such as an extruded (but not compressed) pipe using one or more of the following techniques:

Visual observation of external marking on the component;
Annealing a sample. The swaging process will produce some axial extension as well as the radial contraction. Generally one would expect an extruded pipe to shrink axially and radially on annealing (at or above the Tg) due to the residual stress from the extrusion process. In the case of a swaged pipe, it would shrink a little axially but expand radially even if the yield point had been exceeded during the swaging process. The fact that the reduced dimensions are frozen in below the Tg means that assessment could be made by this technique;
Raman Spectroscopy may be used to analyse the surfaces (external and internal) to determine the stress state of the polymer in the component.

The invention extends to a compressed component which comprises a first polymer as described herein. The compressed component is preferably in the form of a pipe, preferably comprising a polymer of formula XX referred to.

The invention further extends to an assembly comprising a compressed component on a carrier. The compressed component is preferably a pipe and said assembly suitably comprises said pipe wrapped round the carrier. The carrier may be a spool and the pipe may be coiled round the spool. The pipe may have a length of at least 5 m, preferably at least 10 m, more preferably at least 20 m, especially at least 50 m. The length may be less than 500 m.

According to a fifth aspect of the invention, there is provided a method of making a compressed component from a selected component comprising a polymeric material which comprises a first polymer having a glass transition temperature (Tg) of at least 100° C. and/or which comprises a moiety I, II and/or III as described, said method comprising: compressing the selected component thereby to produce a compressed component.

The invention extends to a method of making an assembly which includes winding a compressed component as described above and/or when made in the method described around a carrier, for example a spool.

The invention extends to a polymeric pipe comprising a first region towards the outside of the pipe which has a lower level of crystallinity compared to the crystallinity of a second region inwards of said first region. Said first region is suitably defined by a skin of said pipe.

The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning Calerimetry (DSC).

The level of crystallinity of said second region may be at least 1%, suitably at least 3%, preferably at least 5% and more preferably at least 10%. In some embodiments, the crystallinity may be greater than 20% or greater than 30%. The difference in the level of crystallinity between said first region and said second region may be at least 5%, preferably at least 10%, more preferably at least 15%, especially at least 20%.

Said first region, for example said outer skin, may be substantially amorphous. Said second region may be crystalline. Preferably substantially the entirety of the material of the pipe inwards of said first region is crystalline.

Any feature of any aspect of any invention or embodiment described herein may be combined with any feature of any aspect of any other invention or embodiment described herein mutatis mutandis.

DESCRIPTION OF THE DRAWINGS

Specific embodiments of the invention will now be described by way of example, with reference to the accompanying drawings in which:

FIG. 4 shown in a reduced condition and inserted in the casing; and

DETAILED DESCRIPTION

The following is referred to hereinafter: VICTREX PEEK polymer—refers to polyetheretherketone obtained from Victrex Plc of Thornton Cleveleys, UK.

The Glass Transition temperature (Tg) of polymers described herein may be measured according to the following Procedure 1.

Procedure 1

The Glass Transition Temperatures (Tg) of polymers may be determined by Differential Scanning Calorimetry (DSC) examining a 10 mg plus or minus 10 microgram powder sample of the polymer in a TA Instruments DSC Q100 under nitrogen at a flow rate of 40 ml/min.

The scan procedure is:
Step 1 Perform and record a preliminary thermal cycle by heating the sample from 30° C. to 450° C. at 20° C./min to erase previous thermal history
Step 2 Hold for 2 mins
Step 3 Cool at 10° C./min to 30° C. and hold for 5 mins.
Step 4 Heat from 30° C. to 450° C. at 20° C./min, recording the Tg.

From the resulting curve the onset of the Tg was obtained as the intersection of lines drawn along the pre-transition baseline and a line drawn along the greatest slope obtained during the transition.

Embodiments of the present invention will now be described.

In general terms, an hollow component made from polyetheretherketone may be reduced in size in order that it may be fitted in an opening and, subsequently, the component may be caused to expand so that it fills the opening and/or abuts walls which define the opening. Thus, the component can be fitted and secured within an opening which it otherwise could not easily be fitted within.

Figure 1:
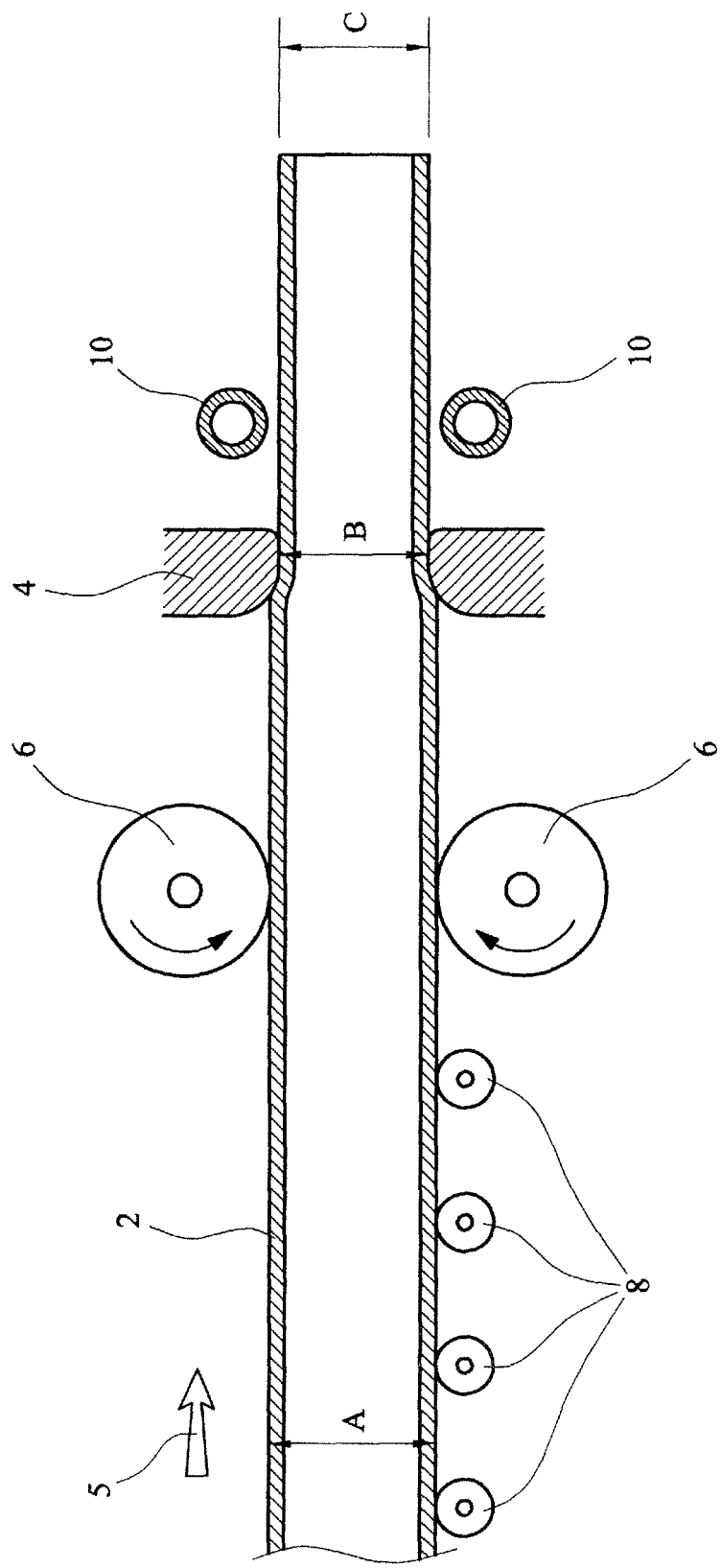
FIG. 1 is a schematic diagram illustrating, partly in cross-section, apparatus in use for swaging (or reducing the diameter of) a pipe.

A long length of pipe made from VICTREX PEEK polymer by extrusion may have its outer diameter reduced so that it can be fitted within a receiver pipe (not shown). Referring to FIG. 1, a part of a liner pipe 2 made from VICTREX PEEK polymer is shown during its passage through an apparatus for swaging (or reducing the diameter of) the pipe. The liner pipe 2 has an external diameter A prior to passage through a die 4 and an outside diameter C after passage through the die 4.

The die 4 is held in position by means not shown. It tapers inwardly in the direction 5 of travel of the pipe 2 therethrough so as to define a relatively wide mouth for initially receiving the pipe 2, the mouth narrowing to define a minimum diameter B of the die. Upstream of the die 4 are a pair of contra-rotating feed rollers 6 and upstream are four idler rollers 8. The rollers 8 support the pipe 2 as it is conveyed by the feed rollers 6 to the die 4. Upstream of the idler rollers may be a very long length of pipe (not shown) which may be carried on a spool (or the like). Downstream of the die 4 are further rollers 10 for facilitating passage of the pipe through the die 4. In use, the pipe 2 is gradually unwound from the spool and forced through the die 4 whereupon its diameter is reduced to diameter B. After it emerges from the die the pipe has a diameter C. Diameters B and C are approximately equal, although C may be slightly greater than diameter B if the pipe relaxes slightly after passing through the die. In any event diameter C is less than diameter A, for example by about 10%.

The pipe 2 need not be subjected to an external heating means prior to or during passage through the die and need not be subjected to a cooling means after passage through the die. Thus, treatment of the pipe may be undertaken at ambient temperature.

The glass transition temperature of VICTREX PEEK polymer is 143° C. Provided the reduced diameter pipe produced as described is not heated to a temperature approaching the glass transition temperature and provided the pipe is not subjected to a significant internal pressure, the pipe will remain at its reduced diameter C substantially indefinitely and certainly for days and weeks after its production. A reduced diameter pipe may therefore be manufactured at a factory and it may be wound on a spool or other carrier prior to being transported to a place wherein it may be used.

The reduced diameter pipe may be used to line another pipe for example a worn or corroded metal pipe which may be a fluid supply pipe in a chemical plant or a mains gas pipe or the like. In use, a pipe to be lined (referred to hereinafter as a "receiver pipe") may have an internal diameter of about A—that is, the internal diameter of the receiver pipe may be approximately the same as the outside diameter A of pipe 2 before reduction by passage through die 4. Thus, prior to reduction, pipe 2 will not fit within the receiver pipe; after reduction, with the pipe 2 having an outside diameter C, it may be slid into the receiver pipe. This step is suitably undertaken at ambient temperature. When arranged within the receiver pipe there may be a slight gap between the outside wall of pipe 2 and the inside wall of the receiver pipe.

Once in position, the pipe 2 is caused to expand so its outer wall is urged against the inner wall of the receiver pipe so the pipe 2 becomes an interference fit within the receiver pipe. The means of expansion may be selected on a case by case basis which may depend on the conditions under which pipe 2 was compressed initially, its wall thickness and diameter, the time available to complete the expansion and the availability of means for heating the pipe, for example from within. Different expansion processes may be as follows:

(i) When the pipe 2 was not compressed beyond its elastic limit (yield point) during swaging, expansion may be achieved by use only of heat. Thus, heat may be applied (in the absence of any means for pressurizing the pipe) to increase the temperature of the pipe to its Tg or above. At or about the Tg, the elastic frozen-in stress in the pipe is able to recover and the pipe will expand.

(ii) When permanent deformation of the pipe 2 occurred during its compression (i.e. when the yield stress of the VICTREX PEEK polymer was exceeded during compression), then heat and pressure may be used to cause expansion.

The pressure required may be given by equation $$P = \frac{2SH}{D}$$

where:
P=estimated pressure to bring about expansion (Pa)
D=external diameter of the pipe (m)
H=wall thickness (m)
S yield stress of the material at the temperature concerned (Pa)

As an example, the pressure required to expand a 10 mm outside diameter polyetheretherketone pipe with a 5 mm wall thickness would be:

12.5 MPa at room temperature
7 MPa at 100° C.
4.5 MPa at 150° C.

A convenient means of applying heat and/or pressure to the liner pipe may be by use of a heated and/or pressurized fluid, (for example superheated steam) which may be input into the pipe. If only heat is required to achieve expansion of the liner pipe and wherein the receiver pipe is metal then the outside of the liner pipe may be heated by suitable means so heat is conducted to the liner pipe.

VICTREX PEEK polymer is a high performance thermoplastic material with excellent physical and chemical properties; however it is relatively costly. To reduce the cost of a liner pipe for use as described, whilst not sacrificing too much performance, the VICTREX PEEK polymer may be blended with other materials, for example other cheaper thermoplastics materials. VICTREX PEEK polymer may be blended with up to 30 wt % of a second polymer which is immiscible therewith (such as polyethersulphone e.g. Ultrason E3010 (Ex Basf). The blended material will comprise a matrix of VICTREX PEEK polymer with the second polymer dispersed as small particles therein. Since the VICTREX PEEK polymer forms the matrix, the properties of the blend, such as Tg and other physical properties enabling it to be compressed and to expand as described herein will be similar to that of the matrix polymer.

Alternatively, VICTREX PEEK polymer could be blended with up to 30 wt % of another polymer (such as a polyetherimide as described in U.S. Pat. No. 5,110,880) which forms a miscible blend with it. In this case, the blend may have properties such as Tg intermediate those of the components of the blend. This may provide a means of increasing the resistance of the polymeric material to expansion after compression. It may be of utility if the liner pipe (or any other compressed component) is to be introduced into a high temperature (or pressure) environment when in its reduced state. The additional resistance to expansion may allow expansion to be delayed until the liner pipe (or other compound) is safely fitted in position.

A method of lining a wellbore will now be described with reference to FIGS. 2 to 7.

Figure 2:
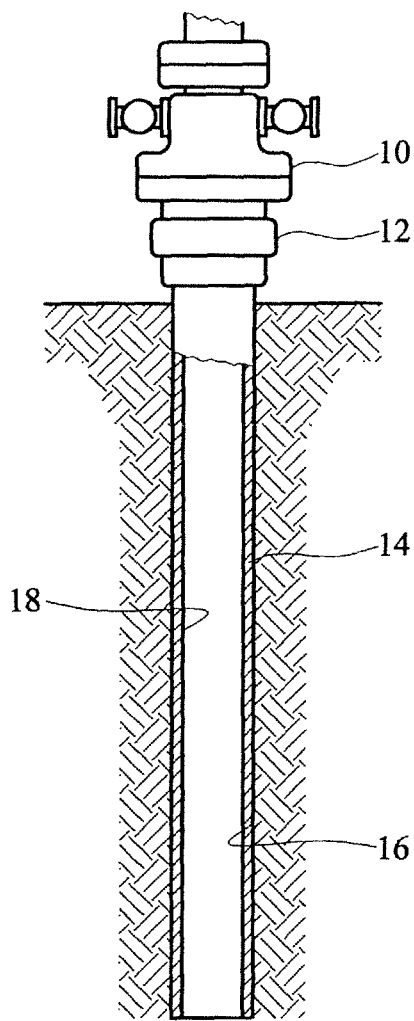
FIG. 2 is a cross-sectional view of a well bore having a casing affixed herein.

Referring to FIG. 2, a typical wellhead 10 utilized in the production of oil and gas from a well is shown. The wellhead 10 includes a casing head 12 which functions to support a casing 14 which is extended down the well to provide a permanent borehole through which production operations may be conducted. The casing 14 is shown affixed in a well bore 16 in a conventional manner, such as by cement (not shown). The casing 14 is illustrated as having an internal wall 18 defining a flow area.

Figure 3:
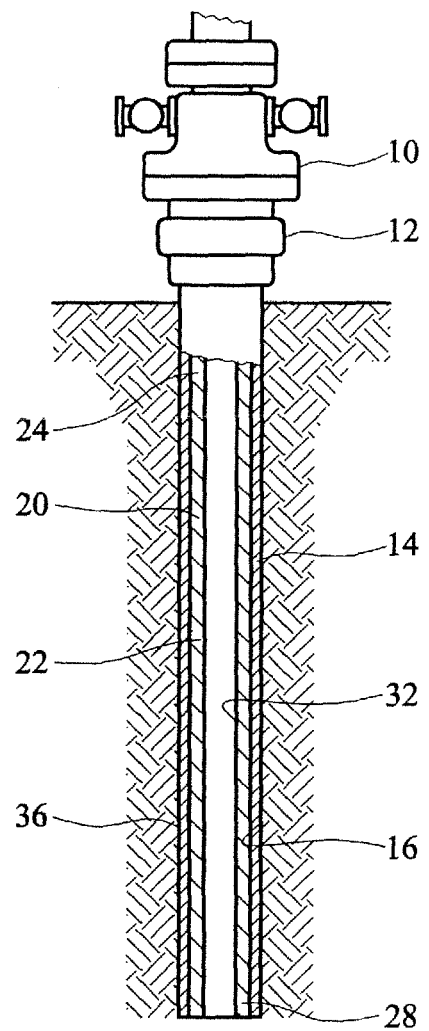
FIG. 3 is a cross-sectional view of the well bore of FIG. 1 showing a casing liner inserted into the casing.
Figure 4:
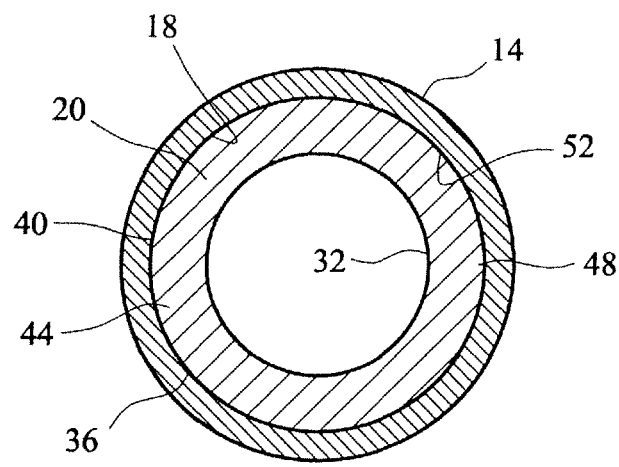
FIG. 4 is a cross-sectional view of the casing liner shown inserted into a casing.

FIG. 3 shows a casing liner 20 inserted in the casing 14. The casing liner 20 is characterized as a polymeric pipe 22 having an upper end 24, a lower end 28, an interior surface 32, and an exterior surface 36. As best shown in FIG. 4, the exterior surface 36 of the casing liner 20 is substantially smooth and is in the form of a circular cross-section cylinder.

The casing liner 20 is fabricated from extruded VICTREX PEEK polymer pipe. The pipe is compressible and has sufficient memory so as to permit the material to return to, or at least near to, its original shape under conditions described herein. More specifically, the polymer is compressible in such a manner that the outer diameter of the casing liner 20 can be substantially reduced in size and the memory of the polymer allows the material to rebound after a period of exposure to elevated pressures and/or temperatures experienced downhole. This capability of the diameter of the casing liner 20 to be downsized enables a tubular liner having an outer diameter greater than the inner diameter of the casing 14 to be inserted into the casing 14. Alternatively, a liner having an outer diameter equal to or less than the inner diameter of the casing 14 can be inserted into the casing 14.

The casing liner may be made from an extruded length of pipe made from VICTREX PEEK polymer by reducing the outside diameter of the pipe by swaging. In this regard, referring to FIG. 5, a part of a pipe 102 made from VICTREX PEEK polymer is shown during its passage through an apparatus for swaging (or reducing the diameter of) the pipe. The pipe 102 has an external diameter A prior to passage through a die 104 and an outside diameter C after passage through the die 104.

The die 104 is held in position by means not shown. It tapers inwardly in the direction 105 of travel of the pipe 102 therethrough so as to define a relatively wide mouth for initially receiving the pipe 102, the mouth narrowing to define a minimum diameter B of the die. Upstream of the die 104 are a pair of contra-rotating feed rollers 106 and further upstream are four idler rollers 108. The rollers 108 support the pipe 102 as it is conveyed by the feed rollers 106 to the die 104. Upstream of the idler rollers may be a very long length of pipe (not shown) which may be carried on a spool (or the like). Downstream of the die 104 are further rollers 110 for facilitating passage of the pipe through the die 104. In use, the pipe 102 is gradually unwound from the spool and forced through the die 104 whereupon its diameter is reduced to diameter B. After it emerges from the die the pipe has a diameter C. Diameters B and C are approximately equal, although C may be slightly greater than diameter B if the pipe relaxes slightly after passing through the die. In any event diameter C is less than diameter A, for example by about 10%.

The pipe 102 need not be subjected to an external heating means prior to or during passage through the die and need not be subjected to a cooling means after passage through the die. Thus, treatment of the pipe may be undertaken at ambient temperature.

The glass transition temperature of VICTREX PEEK polymer is 143° C. Provided the reduced diameter pipe produced as described is not heated to a temperature approaching the glass transition temperature and provided the pipe is not subjected to a significant internal pressure, the pipe will remain at its reduced diameter C substantially indefinitely and certainly for days and weeks after its production. A reduced diameter pipe may therefore be manufactured at a factory and it may be wound on a spool or other carrier prior to being transported to a place wherein it may be used. A length of pipe may then be cut from that on the spool as may be required.

For a casing 14 having an outer diameter of about 14 cm and an inner diameter of about 12.6 cm, an extruded VICTREX PEEK polymer pipe having (before swaging) an outer diameter of about 12 cm to about 13.3 cm might be used to line the casing 14 depending on whether a tight, neutral or loose fit is desired.

Figure 6:
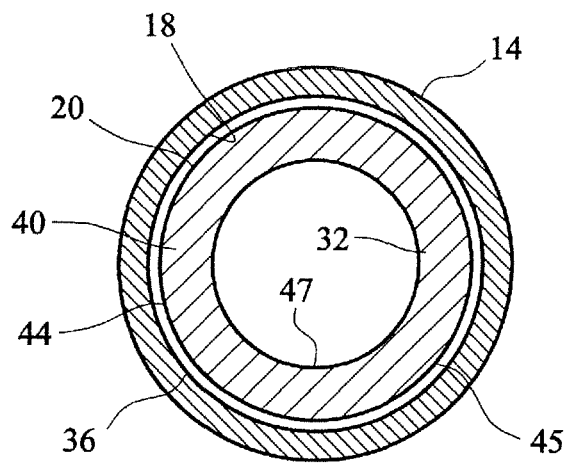
FIG. 6 is a cross sectional view of the casing liner
Figure 5:
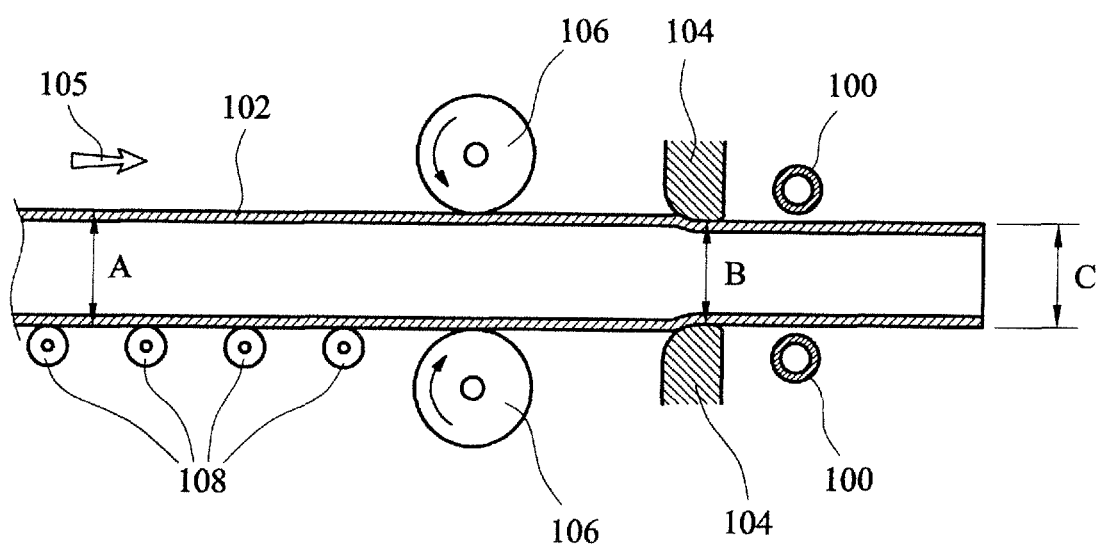
FIG. 5 is a schematic diagram illustrating, partly in cross-section, apparatus for use in swaging (or reducing the diameter) of a pipe.

A casing liner 20 made from a length of reduced diameter pipe 102 as described may be fitted in position within casing 14 as described hereinafter. Once in position as represented in FIG. 6, the liner 20 is caused to expand so its exterior surface 36 is urged against the inner wall 40 of the casing 14 so the liner 20 becomes an interference fit within the casing 14. The means of expansion may be selected on a case by case basis which may depend on the conditions under which pipe 102 was compressed initially, its wall thickness and diameter, the time available to complete the expansion and the availability of means for heating the pipe, for example from within. Different expansion processes may be as described generally above, When using VICTREX PEEK to manufacture a pipe as described, the pipe may be manufactured so that it is substantially crystalline throughout its extent or it may be manufactured to have an amorphous skin on the outside of a crystalline internal region. A pipe which is substantially crystalline throughout may be made by extruding the VICTREX PEEK to form a pipe and cooling the polymer following extrusion at a rate which is sufficiently slow to allow the crystallisation process to occur such that a sufficiently high level (e.g. 25 to 35%) crystallinity is achieved. A pipe which has an amorphous skin may be produced by cooling the outside of the extruded pipe quickly so that there is insufficient time for crystallisation in the outer regions of the pipe. A pipe which is substantially crystalline throughout is generally more resistant to expansion and, accordingly a suitable combination of temperature, internal pressure and an axial compressive load may be used to expand the pipe. A pipe which has an amorphous skin may be more easily expanded and this may be achieved using a suitable temperature and internal pressure.

An example of axial compressive, internal pressure and temperature that produce satisfactory expansion results with an amorphous skinned pipe would be:
Pipe diameter 4.2" SDR 28
Internal pressure=800 psi
Axial compressive load=12000 lb
Temperature=175° F.

Figure 7:
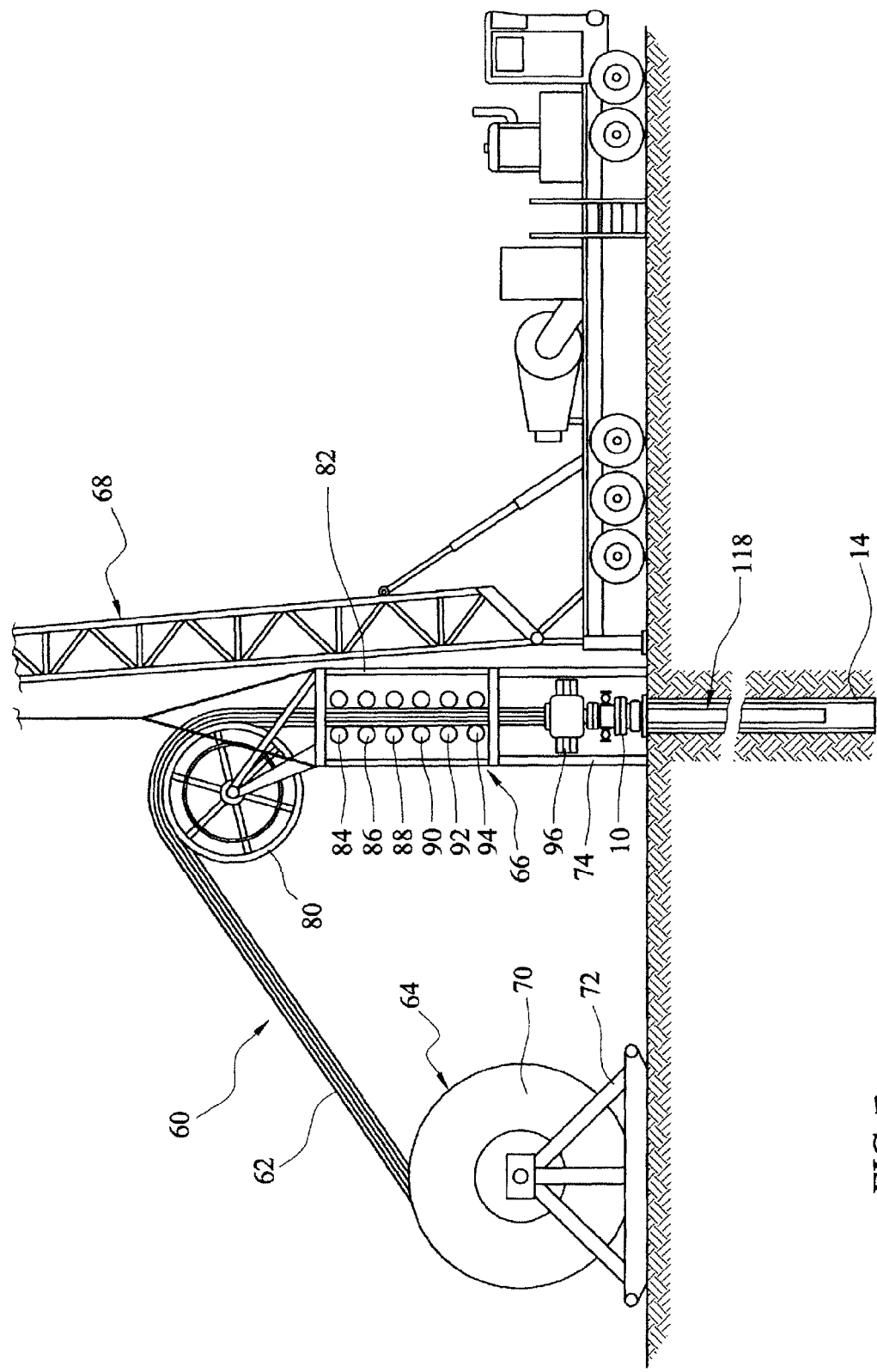
FIG. 7 is a diagrammatical illustration of a casing liner injector unit.

Referring now to FIG. 7, an injector unit 60 constructed for both reducing the diameter of a VICTREX PEEK polymer pipe, such as a coiled polymeric pipe 62, and injecting it into the casing 14 in order to form the casing liner 20 (FIG. 3) is schematically illustrated. The injector unit 60 includes a reel 64 for handling and storing the coiled polymeric pipe 62 and a roller reduction unit 66 for directing the pipe 62 into the casing 14, reducing the diameter of the pipe 62 to the desired diameter, and injecting the reduced pipe 62 into the casing 14 to form the casing liner 20. A conventional workover rig 68 is also utilized in the process of positioning the pipe 62 in the casing 14. As an alternative to the workover rig 68, other lifting and supporting structures, such as a crane, can be employed. The reel 64 includes a spool 70 rotatably mounted to a frame 72. The frame 72 is set on a suitable support surface such as the ground, a trailer, or offshore platform deck.

The roller reduction unit 66 is supported above the wellhead 10 by a support structure 74. The workover rig 68 is also connected to the roller reduction unit 66 so as to cooperate with the support structure 74 to support the roller reduction unit 66 above the wellhead 10. The connection of the workover rig 68 to the roller reduction unit 66 further facilitates the rigging up and the rigging down of the roller reduction unit 66 by enabling the roller reduction unit 66 to be moved from a trailer (not shown) to its position over the wellhead 10 and back to the trailer once the injection process is completed.

The roller reduction unit 66 includes a guide wheel 80 and a support frame 82. The support frame 82 supports several banks of rollers 84, 86, 88, 90, 92, and 94 which are each journaled to the frame 82. The rollers in each bank 84-94 are arranged to form a substantially circular passageway through which the pipe 62 is passed. Each subsequent bank of rollers 86-90 from the upper end to the lower end provides the passageway with a diameter smaller than the diameter provided by the previous bank of rollers 84 thereby cooperating to form a substantially frusto-conically shaped passageway such that the outer diameter of the pipe 62 will be gradually reduced as the pipe 62 is passed therethrough. As stated above, the banks of rollers 84-90 can be set up to reduce the outer diameter of the pipe 62 in a range of from 0 to about 25%. The portion of the passageway formed by the banks of rollers 92 and 94 provide the passageway with a diameter that is the same size as the portion of the passageway formed by the banks of roller 90 and thus the banks of rollers 90, 92, and 94 are adapted to frictionally engage the reduced pipe 62 to provide the thrust to snub the reduced pipe 62 into the casing 14 and to control the rate of entry into the casing 14. To this end, each bank of rollers 84-94 is controlled by a hydraulic motor (not shown). The hydraulic motors are used to control the insertion rate of the pipe 62 into the casing 14 with respect to injection, as well as braking of the pipe 62.

The roller reduction injector unit 66 is supported in an elevated position above the wellhead 10 with support structure 74 which can include a plurality of telescoping legs or other suitable device such a hydraulic jack stand. It should be noted that the roller reduction injector unit 66 should be elevated sufficiently above the wellhead 10 to permit access to the wellhead 10 during the pipe injection process and to accommodate additional equipment, such as a blow out preventer 96.

Roller reduction units as briefly described above are well known in the art. Thus, no further description of their components, construction, or operation is believed necessary in order for one skilled in the art to understand the unit.

Regardless of the manner in which the polymeric pipe 62 is injected into the casing, the pipe 62 should remain in a reduced state as the pipe 62 is being injected into the casing 14 and until the pipe 62 is set at the desired depth. As described above, a casing liner made from VICTREX PEEK polymer as described may remain in its reduced diameter state substantially indefinitely when its temperature is less than its Tg and when it is not subjected to significant internal pressure. Thus, in use, there may generally be no time pressure for positioning the liner in position.

Before the pipe 62 is inserted into the casing 14 to provide the casing liner 20, the casing 14 is cleaned with a brush or scrapper to remove debris such as cement. The well is then killed by injecting KCl, inserting a bridge plug downhole, or other methods of killing a well. The pipe 62 is then fed over the guide wheel 80 and into the roller reduction unit 66. The roller reduction unit 66 is operated to inject the pipe 62 into the casing 14, as illustrated in FIG. 7. After the pipe 62 is run a distance into the casing 14, the roller reduction unit 66 is operated as a braking system to control the rate of descent of the pipe 62 due to the weight of the pipe 62.

Once the pipe 62 is run to the desired depth in the casing 14, the pipe 62 is caused to expand into position against the casing 14 thereby effectively lining the casing 14. Next, the pipe 62 is cut and fused to a flange which is, in turn, attached to the wellhead 10.

Expansion of the pipe 62 to its final position may be achieved by exposure to elevated downhole temperature and pressure. Alternatively, expansion of the pipe 62 can be induced by exposing the pipe 62 to an appropriate high temperature and/or pressure. This can be achieved by circulating a hot, optionally pressurized, fluid through the pipe 62 after the pipe 62 is inserted and flanged to casing 14.

As an alternative to the use of the complete apparatus of FIG. 7, only part of the apparatus will be required if a liner pipe is prepared off-site and transported in a reduced state to the well-head. This may save significant costs associated with the use of apparatus.

The invention claimed is:

1. A method of fitting a component in a receiver, the method comprising:
   a) compressing a selected component by application of an external applied force thereby to produce a compressed component, wherein said selected component comprises a polymeric material and said polymeric material comprises a first polymer having a glass transition temperature (Tg) of at least 100° C.; or
   (a*) selecting a compressed component compressed according to step (a) which comprises a polymeric material wherein said polymeric material comprises a first polymer having a glass transition temperature (Tg) of at least 100° C.;
   wherein either step (a) or step (a*) is in combination with the following steps:
   (b) arranging the compressed component in position within the receiver; and
   (c) subjecting the compressed component to an increase in temperature whereby the compressed component expands to fit the receiver,
   and wherein between steps (a) or (a*) and (b) the component is maintained in its compressed state by maintaining the temperature of the compressed component below the Tg of the first polymer in said polymeric material.

2. A method according to claim 1, wherein said selected component or said compressed component comprise a pipe.

3. A method according to claim 1, wherein the ratio of the wall thickness to diameter of a pipe selected for compression is less than 0.06 and is at least 0.01.

4. A method according to claim 1, wherein with said selected component at a temperature which is at least 20° C. less than the Tg of said first polymer, said selected component is subjected to an external applied force to compress the component and produce said compressed component.

5. A method according to claim 1, wherein, after compression in step (a) and prior to step (b), said compressed component is subjected to a temperature of at least 10° C. and less than 50° C.

6. A method according to claim 1, wherein between steps (a) and (b), no outside force is applied to said compressed component to restrict it from expanding.

7. A method according to claim 1, wherein during the entirety of step (b), the temperature of the compressed component does not rise about the Tg of said first polymer.

8. A method according to claim 1, wherein said compressed component is a pipe and the ratio of the outside diameter of the compressed pipe produced in step (a) to that of the expanded pipe in step (c) is at least 0.8.

9. A method according to claim 1, wherein said first polymer has a Tg of at least 120° C. and of less then 260° C.

10. A method according to claim 1, wherein said first polymer has a moiety of formula

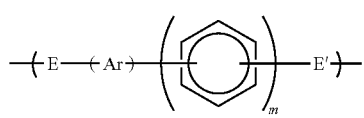

I and/or a moiety of formula

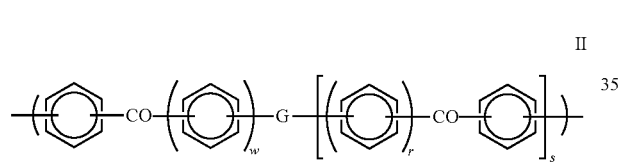

II and/or a moiety of formula

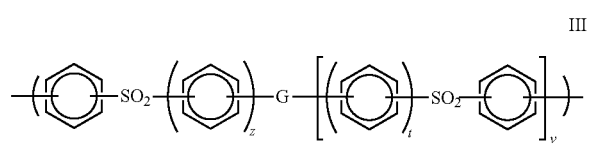

III wherein the phenyl moieties in units I, II, and III are independently optionally substituted and optionally cross-linked; and wherein m,r,s,t,v,w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)**, (i) to (vi) which is bonded via one or more of its phenyl moieties to adjacent moieties

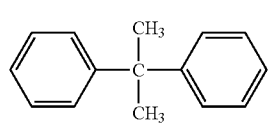

(i)**

(i)

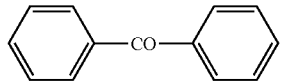

(ii)

(iii)

(iv)

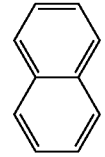

(v)

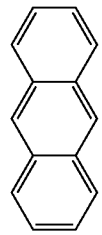

(vi)

11. A method according to claim 1, wherein said first polymer is selected from polyetheretherketone, polyetherketone, polyetherketoneetherketoneketone and polyetherketoneketone.

12. A method according to claim 1, wherein said first polymer is polyetheretherketone.

13. A method according to claim 1, wherein said polymeric material is a blend of polymers which comprises said first polymer and a second polymer.

14. A method of fitting a component in a receiver, the method comprising:

a) compressing a selected component by application of an external applied force thereby to produce a compressed component, wherein said selected component comprises a polymeric material and said polymeric material comprises a first polymer having a glass transition temperature (Tg) of at least 100° C.; or (a*) selecting a compressed component compressed according to step (a) which comprises a polymeric material wherein said polymeric material comprises a first polymer having glass transition temperature (Tg) of at least 100° C.;

wherein said first polymer is a homopolymer having a repeat unit of general formula

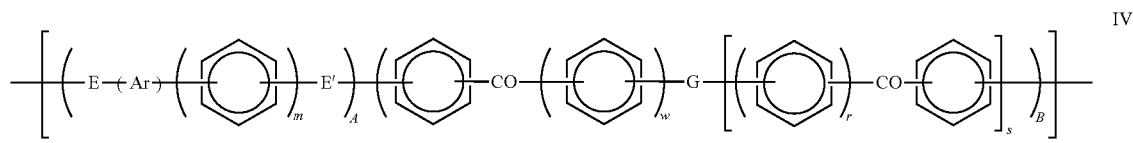

or a homopolymer having a repeat unit of general formula

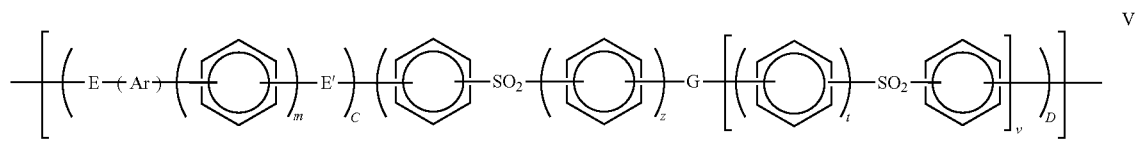

or a random or block copolymer of at least two different units of IV and/or V; or
said first polymer is a homopolymer having a repeat unit of general formula

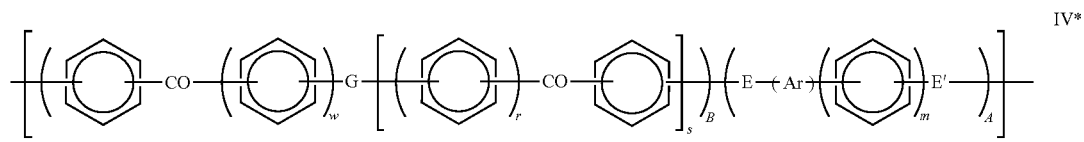

or is a homopolymer having a repeat unit of general formula

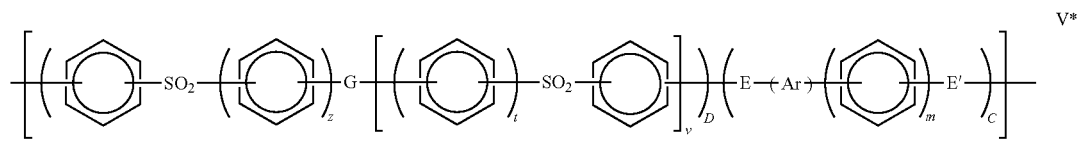

or a random or block copolymer of at least two different units of IV* and/or V*;
wherein A, B, C, and D independently represent 0 or 1, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (vii) to (xiii) and (xi)**

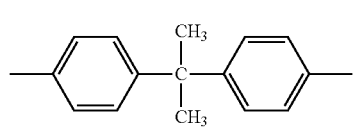 (xi)**

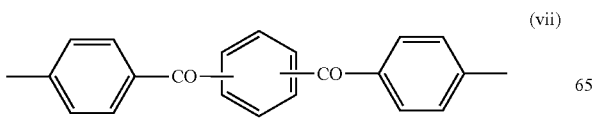 (vii)

-continued

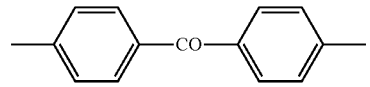 (viii)

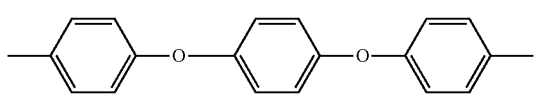 (ix)

(x)

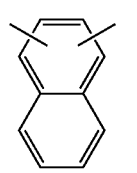 (xi)

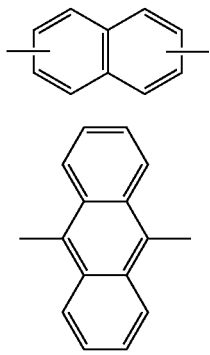

wherein either step (a) or step (a*) is in combination with the following steps:

(b) arranging the compressed component in position within the receiver; and (c) subjecting the compressed component to an increase in temperature whereby the compressed component expands to fit the receiver, and wherein between steps (a) or (a*) and (b) the component is maintained in its compressed state by maintaining the temperature of the compressed component below the Tg of the first polymer in said polymeric material.

15. A method of fitting a component in a receiver, the method comprising:

a) compressing a selected component by application of an external applied force thereby to produce a compressed component, wherein said selected component comprises a polymeric material and said polymeric material comprises a first polymer having a glass transition temperature (Tg) of at least 100° C.; or (a*) selecting a compressed component compressed according to step (a) which comprises a polymeric material wherein said polymeric material comprises a first polymer having a glass transition temperature (Tg) of at least 100° C.;

wherein said first polymer comprises a repeat unit of formula (XX)

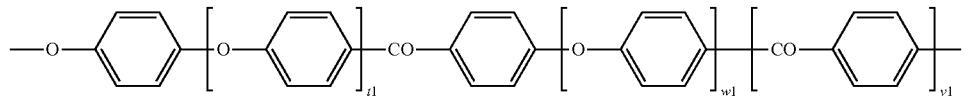

where t1, and w1 independently represent 0 or 1 and v1 represents 0, 1 or 2, wherein either step (a) or step (a*) is in combination with the following steps:

(b) arranging the compressed component in position within the receiver; and (c) subjecting the compressed component to an increase in temperature conditions whereby the compressed component expands to fit the receiver, and wherein between steps (a) or (a*) and (b) the component is maintained in its compressed state by maintaining the temperature of the compressed component below the Tg of the first polymer in said polymeric material.

* * * * *